W. A. ROBBINS.
TIRE MOLD.
APPLICATION FILED APR. 26, 1913.
1,156,180.
Patented Oct. 12, 1915.
2 SHEETS—SHEET 1.
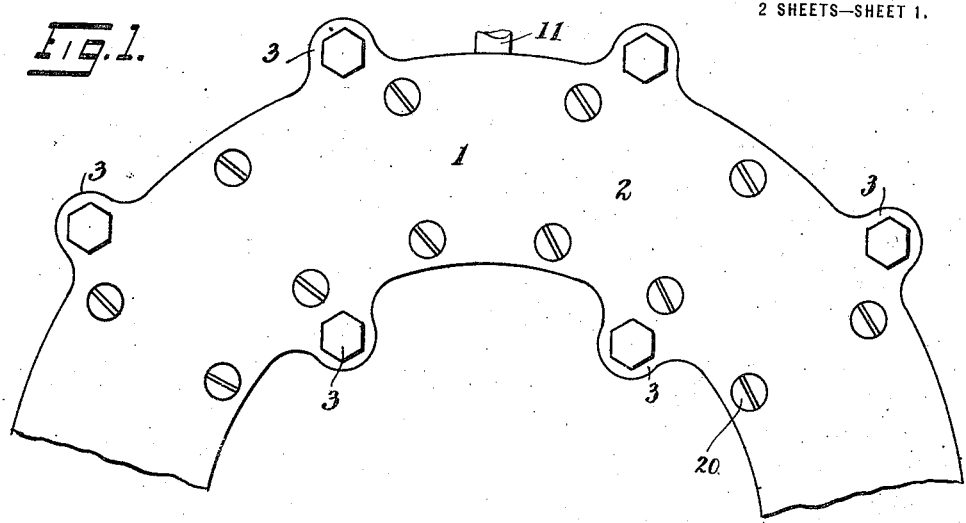
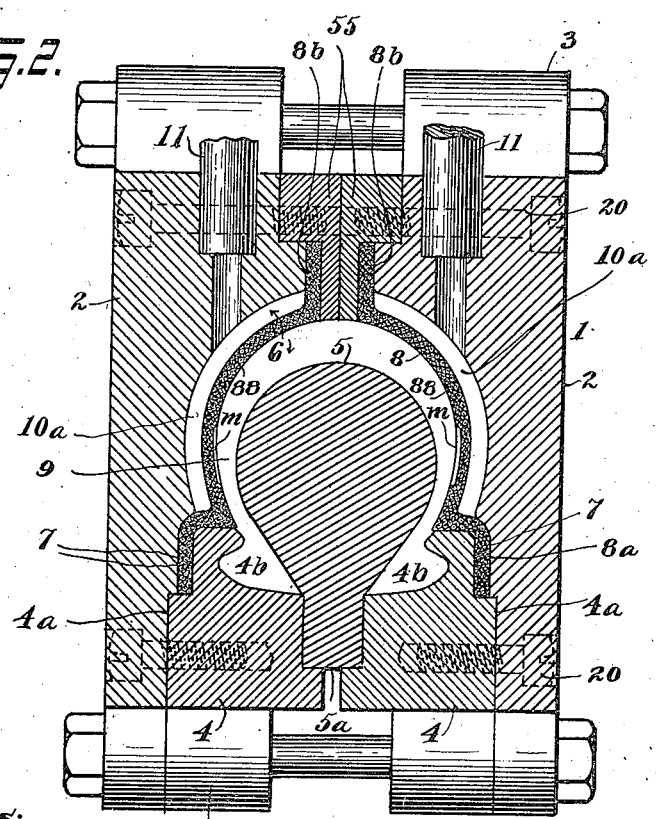
Witnesses:
Chas E Whiteman
H. D. Penney
Inventor:
William A. Robbins,
By his Att'y, F. H. Richards W. A. ROBBINS.
TIRE MOLD.
APPLICATION FILED APR. 26, 1913.
1,156,180.
Patented Oct. 12, 1915.
2 SHEETS—SHEET 2.
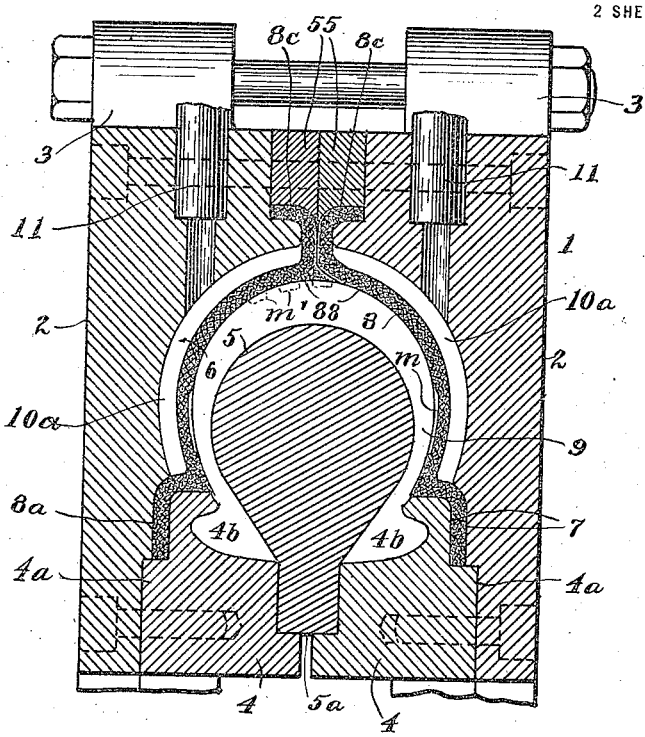
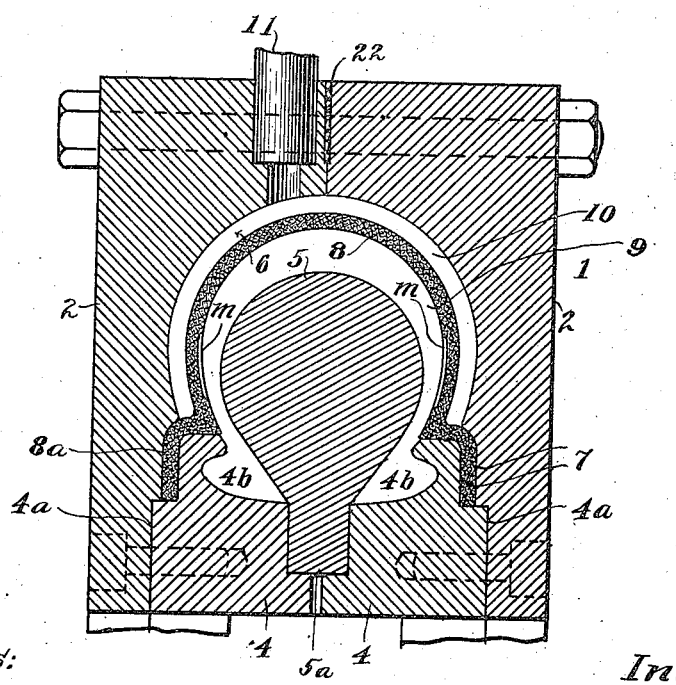
Witnesses:
Chas. E. Whiteman
L. D. Penney
Inventor:
William A. Robbins,
By his Att'y, F. A. Richards

UNITED STATES PATENT OFFICE.

WILLIAM A. ROBBINS, OF GLEN RIDGE, NEW JERSEY.

TIRE-MOLD.

1,156,180. Specification of Letters Patent. Patented Oct. 12, 1915.

Application filed April 26, 1913. Serial No. 763,699.

*To all whom it may concern:*

Be it known that I, WILLIAM A. ROBBINS, a citizen of the United States, residing in Glen Ridge, in the county of Essex and State of New Jersey, have invented certain new and useful Improvements in Tire-Molds, of which the following is a specification.

The object of my invention is to provide molds in which pneumatic tires can be accurately, safely, and symmetrically formed, and with a perfect interior surface for contact with the pneumatic tube, and in whose normal use it will be impossible for the members of such tire to become upset, overlapped, unsymmetrically disposed, or unequally strained.

In the use of entirely rigid models it frequently occurs that the fabric members become unsymmetrical in some of the plies of fabrics in the wall at various places, and the wall is upset in these places and unequally strained; and therefore the tires have weak zones or zones of unequal elasticity, and are therefore short lived, misshapen, and unsatisfactory in use. In other known methods of manufacture, these unsymmetrical spots, or wrinkles, cause rough inner surfaces which chafe or wear out the inner tube, as well as weakening the walls of the shoe. My invention remedies these defects by providing, in a metal, multiple part mold, a highly finished core or forming member which properly forms and locates the tire in the mold; a forming chamber considerably longer than, and practically concentric with, the tire; an impervious flexible formative or pressure-transmitting diaphragm whose edges make water-tight joints with the mold bodies and which divides the forming chamber into a tire chamber and a hydraulic chamber, respectively, interior and exterior to said diaphragm; and a source of hydraulic power suitably connected with said hydraulic chamber, and valve-controlled.

In the drawings, Figure 1 is a partial axial view or plan of my improved mold, and Figs. 2, 3 and 4 are cross-sections through a limb, respectively illustrating three variants of my invention.

In the practice of my invention I form a mold, 1, of two similar and matching cylindrical metal copes, 2, provided with lugs 3, by which they can be bolted up; two similar and matching interior metal cheeks, 4, and a highly-finished metal core or forming means, 5, located in the transverse central plane of the mold. The shank $5^a$ of the core 5 engages corresponding recesses in the cheeks 4, and shoulders $4^a$ on the cheeks engage corresponding recesses in the copes 2; and thus the mold members are accurately centered and alined. In the faces of the cheeks I turn bead-grooves $4^b$ conforming with the contour of the tire-beads. The faces of the copes 2 are turned out substantially concentric with, and somewhat longer than, the tire, so that when assembled the mold-members inclose a forming chamber 6, whose interior wall is the face of the core 5 and whose exterior walls are the faces of the copes 2 and cheeks 4.

On the adjacent faces of the cope cheeks, I form seats 7, and I provide a flexible, yet sensibly stiff, or rather nearly rigid formative diaphragm 8, whose heel flanges $8^a$ are clamped between and make tight joints with the seats 7, whose interior contour when unstrained is substantially concentric with, and slightly larger than, the desired tire-contour and which is preferably made of rubber-filled cloth; although there are other materials which will be satisfactory, such as hard rubber or paper filler; the essential quality being that the formative diaphragm be made of a sufficiently-compressible water-tight impervious material.

The diaphragm 8 divides the forming chamber 6 into an interior tire chamber 9 and a hydraulic chamber 10; and I connect the latter by pipes 11 with a source of hydraulic power.

In the simplest variant, illustrated in Fig. 4, the diaphragm 8 joins the mold only at the seats 7, and the hydraulic chamber 10 is unital; and I make a tight circumferential joint between the copes 2, by means of a suitable packing 22. In the use of this variant the mold is assembled inclosing an assembled, but as yet unsolidified and untreated, tire in the tire chamber 9. Water under pressure is then admitted to the hydraulic chamber 10, presses the formative diaphragm 8 against the tire and the reaction of the core 5, and solidifies it without danger of upsetting or unequally straining its wall or causing unsymmetrical distribution of the reinforcing strip, fabric wall and tread-stock. In this variant there is a possibility that the reinforcing strip and tread may be flattened and thinned at the crown;

and to provide against this contingency, I have designed the variants illustrated in Figs. 2 and 3, in which I positively limit the finished tire-diameter at the crown by connecting the diaphragm 8 to the copes adjacent thereto.

As illustrated in Fig. 2, I interpose between the copes, outer cheek-rings, 55; form the diaphragm in two halves 88; make tight joints between their crown-flanges 8$^b$ and the copes and outer cheeks; divide the hydraulic chamber into two parts, 10$^a$; and connect each, by a pipe or branch 11, with a source of hydraulic power.

In the variant illustrated in Fig. 3, I form the diaphragm of halves, united at the crown by a lapped joint and with outturned cup-flanges 8$^c$ adapted to make cup-joints with the outer cheeks. Either of these variants is used in the manner heretofore set forth. In that illustrated in Fig. 2 there will be slight fins formed around the joints between the diaphragm halves 88 and the outer cheeks 55, which will not occur in the variant illustrated in Fig. 3.

I may provide screws, 20, as shown in dotted lines, to secure the cheeks in the copes; but such are not necessary. I may form patterns $m$ or $m'$, upon the formative surface of the diaphragm 8 corresponding with any characters or surface configurations which it may be desired to impress upon the exposed surface of the tire, such as numbers, legends, ribs or lozenge forms.

It is obvious from all of the foregoing that other fluid pressure means can be used besides hydraulic pressure.

Having thus described my invention, I claim:

1. The combination in a fluid pressure tire mold comprising two rigid outer members and two rigid inner members, a rigid core positioned centrally interior to said outer members and clamped in place between said two inner members, and two flexible water-tight formative diaphragm members forming a tire receiving chamber, said diaphragm members being clamped at their outer abutting free annular edges between the abutting edges of the outer members at the tread portion of the tire being treated, and at their inner free annular edges between the outer and inner members at the clencher portions of the tire being treated.

2. The combination in a fluid pressure tire mold comprising rigid and removable and enveloping parts, rigid inner cheek rings between said parts, of bead recesses formed into the said cheek rings, a rigid central positioning and internal forming part, and a flexible water tight formative diaphragm clamped between said enveloping part and cheek rings.

3. The combination in a fluid pressure tire mold comprising rigid outer enveloping members, a rigid finished core positioned centrally interior to said enveloping members, outer cheek rings between said enveloping members, and a flexible water tight formative diaphragm making tight joints with said enveloping members adjacent to its heel and crown, said cheek rings forming contour limiting means for the tread portion of said tire.

4. The combination in a fluid pressure tire mold comprising two rigid outer enveloping members and two rigid inner enveloping members, a rigid core positioned centrally interior to said outer enveloping members and clamped in place between said two inner enveloping members, said enveloping members inclosing a forming chamber, and two flexible water-tight formative diaphragm members dividing said forming chamber into a pressure transmitting chamber and tire receiving chamber, said diaphragm members being clamped at their outer abutting free annular edges between the abutting edges of the outer enveloping members at the tread portion of the tire being treated, and at their inner free annular edges between the outer and inner enveloping members at the clencher portions of the tire being treated.

5. The combination in a fluid pressure tire mold comprising two rigid outer annular members and two rigid inner annular members, a rigid core positioned centrally interior to said outer annular members and clamped in place between said inner annular members, and a flexible water-tight formative diaphragm forming a tire receiving chamber, said diaphragm clamped at its inner free annular edges between the outer and inner annular members at the clencher portions of the tire being treated.

WILLIAM A. ROBBINS.

Witnesses:
FRED. J. DOLE,
HAROLD D. PENNEY.